Jan. 14, 1947.   W. WOERNER   2,414,347
PRODUCTION JIG-VISE
Filed Nov. 18, 1944   2 Sheets-Sheet 1

INVENTOR
William Woerner
BY Harold F. Scribner
ATTORNEY

Jan. 14, 1947. W. WOERNER 2,414,347
PRODUCTION JIG-VISE
Filed Nov. 18, 1944 2 Sheets-Sheet 2

INVENTOR
William Woerner
BY Harold F. Leibner
ATTORNEY

Patented Jan. 14, 1947

2,414,347

UNITED STATES PATENT OFFICE 2,414,347

PRODUCTION JIG VISE

William Woerner, Greenbrook Township, Middlesex County, N. J.

Application November 18, 1944, Serial No. 564,111

6 Claims. (Cl. 77—62)

This invention has to do with production equipment and is concerned more particularly with improvements in jig-vises useful in the clamping of workpieces and simultaneously the locating of the tool in cooperative relation therewith preparatory to performing a tooling operation on the clamped piece.

In the usual type of jig-vise, there is provided two relatively movable work-clamping jaw members operated by a lever. The lever, ordinarily, is movable through an arc of approximately 90° and the range of vise jaw movement is relatively small. Such vises are usually vertically arranged and therefore side-loading becomes necessary, i. e., workpieces are inserted into the space between the upper and lower jaws from the side, and then the jaws are brought toward each other to effect the work-clamping action.

Frequently, however, the workpiece to be operated upon must be guided or located on three or more sides, or all around, and clamped at its top and under surface. Such workpieces can be held in the prior jig vises only by removing therefrom parts of the work locating devices so as to permit lateral insertion of the work. Thereafter, the locating devices are replaced and the piece clamped by lowering the upper combined jaw and bushing plate member. Many extra and time consuming operations thus have to be performed and the production of the parts is at a relatively slow rate.

A primary aim of this invention is to enable the operator to increase the production rate by dispensing with the need to remove and replace work locating parts of the fixture for each workpiece. In the herein disclosed embodiments of the invention, the foregoing objective has attained by so constructing a jig-vise that the upper combined work-clamp and tool-bushing plate is normally rigidly connected but bodily movable out of its normal position in relation to the lower jaw, when the plate is in an unclamped position. With the bushing plate moved bodily out of the way and out of coacting relation with the lower jaw member of the vise, the workpieces may be placed into locating cavities in the fixture directly from the top, and as readily removed therefrom. Heavy workpieces, for example, that require the two hands of the operator or a crane to lift them, may by this invention of a normally rigid but laterally movable jig-vise top plate, be raised from and lowered into the jig-vise quickly and expeditiously.

A further aim of the invention is to render available a jig-vise, having a laterally movable clamping and bushing plate member, which is of simple construction and operation, and which embodies great strength and accuracy in its clamping and tool locating characteristics.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which—

Figure 7:
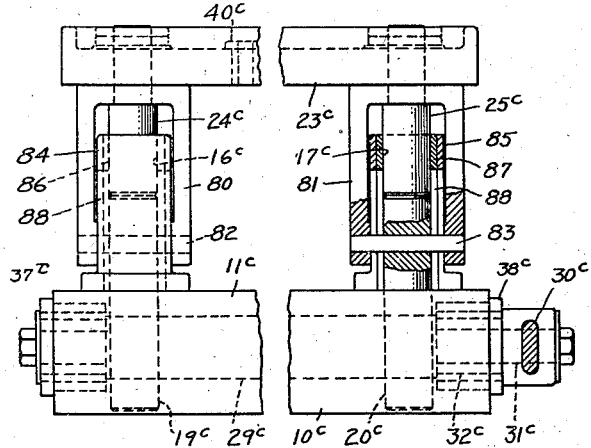
Figure 8:
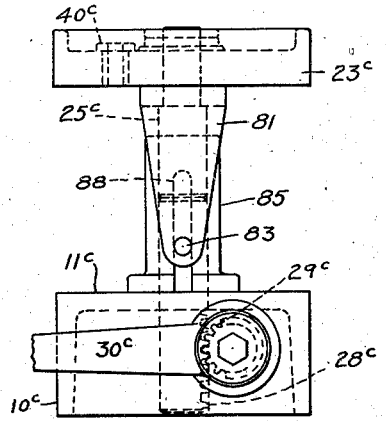

And Figs. 7 and 8 illustrate the invention applied to a jig-vise of the straddle type and in which the pivotal axis for the upper jaw is located relatively close to the lower jaw.

Figure 1:
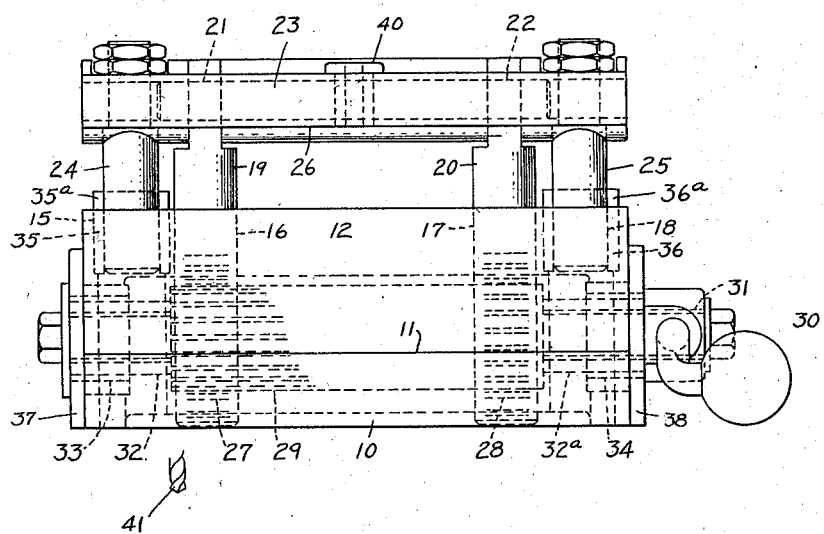
Figure 1 is a front elevational view of a jig-vise embodying the principles of this invention.
Figure 2:
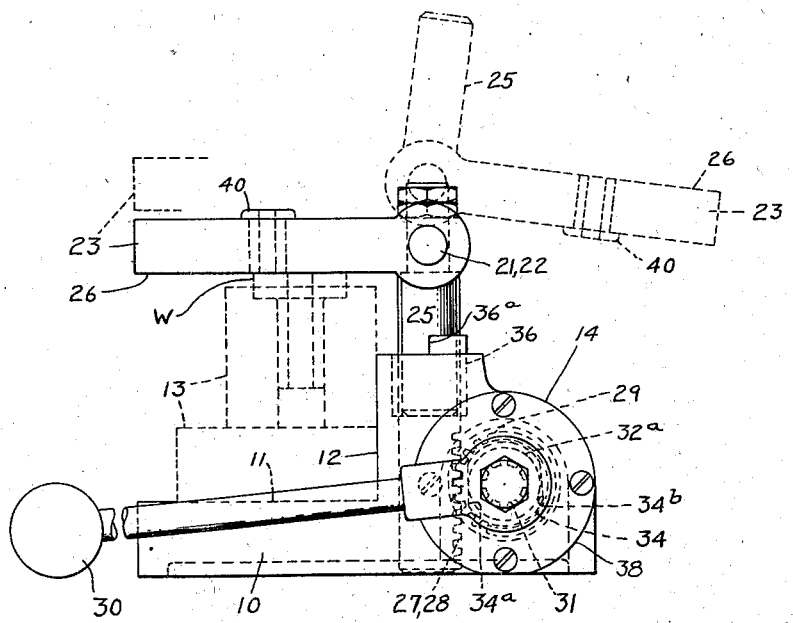
Fig. 2 is a side view of the vise illustrated by Fig. 1, showing in dotted lines, the position of the upper jaw of the vise when fully unclamped, and when the upper jaw member is tilted completely out of the way to permit top loading.

Referring more particularly to the preferred embodiment of the invention depicted in Figs. 1 and 2, the production jig-vise illustrated comprises a base member 10 having a work supporting platform 11 and an angularly disposed upstanding wall 12, in or to which work-locating and work-supporting members 13 are secured in a known way. The members 13 are, it will be understood, so contoured and located as to suit the particular shape of the workpiece W that is to have a tooling operation, such as drilling, performed thereon. The back wall 12 of the vise is amply reinforced as at 14 and is provided with aligned and parallel plunger bores 15, 16, 17 and 18. The inner pairs of bores 16, 17, receive pullshafts 19 and 20 that are pivotally connected at 21 and 22 to the rear portions of an upper vise-jaw member 23. The outer pair of bores 15 and 18 receive pilot bars 24 and 25 that are secured rigidly and perpendicularly to, the plane of the under surface 26 of the upper jaw member 23.

The pull-shafts 19 and 20 function as draw bolts, in the instant embodiment, and are provided with rack teeth 27, 28 along their lower rear portions that are meshed by the teeth of a wide faced pinion 29 that is journaled in the base 10. Rotation of the pinion will through the connections mentioned, raise or lower the upper jaw 23. Such raising and lowering is, in this embodiment, effected by a hand lever 30 that is splined to a reduced end portion 31 of the pinion 29. Locking of the upper plate in clamped position is obtained in any well known manner as, for example, a wedging action of the actuating pinion shaft. Fig. 2 illustrates the principal elements of such a lock, which are annular bearing rings 32, 32$^a$ splined to the reduced ends of the pinion 29, and journaling slots 33, 34 formed in bushing members 37 and 38 respectively that are fitted and secured to the base 10. The front walls 34$^a$ of these slots, i. e., the walls on the rack shaft side are flat and substantially parallel to the rack teeth 27, 28, and the rear walls 34$^b$ of the slots lean forward slightly in an upward direction. As the pinion 29 and bearing rings 32, 32$^a$ lie behind the rack bars, a counterclockwise turning of the pinion (as viewed in Fig. 2) will propel the upper jaw member in a work clamping direction, and the pinion will tend to climb the rack teeth thereby bringing the bearing rings 32, 32$^a$ into the more narrow portions of the slots 33, 34. So long as the upper jaw continues to move in response to the turning of the pinion, the fulcrum point of the lever action is at the rear walls of the slots and the bearing rings do not bind. However, as the downward movement of the clamp plate 26 ceases, by engaging the work W, the fulcrum point shifts to the front walls of the slots and the pinion is forced to climb the racks and the bearing rings brought to bind in their tapered slots, and the parts are clamped. Any upward thrust on the upper jaw member tends to tighten the clamp still further.

The release of the clamp is effected by operating the rack pinion 29 in a clockwise direction (in Fig. 2), which action, it will be seen, causes the pinion first to travel down the rack teeth 27—28, whereby the bearing rings 32, 32$^a$ are released from clamped position and brought into the wider portions of their slots, where they, and the pinion, are free to turn.

During a substantial portion of the up and down movement of the upper jaw 23, the plane of the under surface 26 thereof is maintained true with the surface 11, and hence with the work W, by means of the piloting bars 24 and 25. These bars slidingly fit bushings 35 and 36 fitted to the bores 15 and 18 in the base, and maintain the projecting jaw 23 rigidly in true alignment, yet permitting vertical movement thereof. On upward movement of the upper jaw, the workpiece is first unclamped, continued upward movement of the jaw, withdraws the pilot bars from their fitted bearings, and the upper jaw member at once becomes free to be rotated completely out of the way to fully expose and permit access to the work. The dotted line position in Fig. 2 illustrates the laterally swung position of the jaw and the freedom of access given thereby to the operations of removing and replacing workpieces, in a vertical direction, in a device of this kind.

The upper jaw member of a unit of this kind functions as a jig-plate, as well, for the purpose of accurately locating and guiding the tool with reference to the work. Figs. 1 and 2 of the drawings illustrate the combined vise-jaw and jig-plate 23 equipped with an accurately located drill bushing element 40, ordinarily made of hardened steel to resist wear, and directly above the bushing, a portion of a tool 41 that is located and guided by the bushing in the upper jaw during the course of a tooling operation on the work clamped by the jaw.

In using a production jig-vise of this kind, the unit is clamped or otherwise firmly secured to the work table of a machine tool, for example, to the table of a drilling machine. The upper jaw member 23 of the vise is accurately drilled and provided with one or more drill bushings of the proper size and at the correct location for the operation to be performed on the workpiece. Supplemental jig parts are then built up upon the platforms 11 and 12 around the workpiece whereby the piece becomes properly located with relation to the tool guiding hole or holes in the upper jaw of the vise. The form and character of the supplemental jig parts depends upon the shape of the workpiece to be pocketed thereby, leaving preferably one surface of the work exposed for direct engagement by the upper jaw of the vise so that when the latter is swung into working position and actuated in a clamping direction, firm clamping of the workpiece simultaneously with accurate tool locating, in a single operation is effected.

After the workpiece is securely clamped the tool spindle is lowered, the tooling operation performed, and the spindle again retracted. The chips are then blown from the unit, and a reverse movement of the jig operating lever, unclamps the work. If the workpiece is relatively long, the piece may not be taken laterally from the fixture, nor will the range of upward movement of the jaw of the ordinary vise permit withdrawal vertically from the top. With the present invention, however, the upper combined jaw member and bushing plate is so devised that it may be swung bodily out of the way as soon as the piloting bars 24 and 25 clear the tops of their guide bushings. To assist in quickly centering the pilot bars 24 and 25 with their bushings 35, 36 on a return movement of the plate 23, the rear half of each bushing may be made to project above the front half, as illustrated at 35$^a$, 36$^a$ in Fig. 1 and Fig. 2, to act as an abutment member and guide means.

Figure 3:
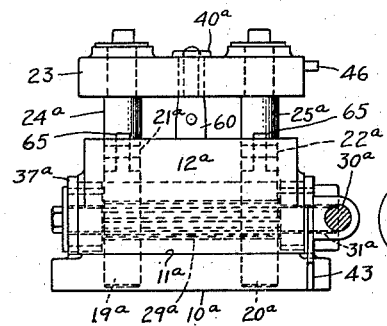
Figs. 3 and 4 are front and end views respectively of a jig-vise, in which the pivot point for the upper jaw of the vise is located medially of the jaw actuating bars.
Figure 4:
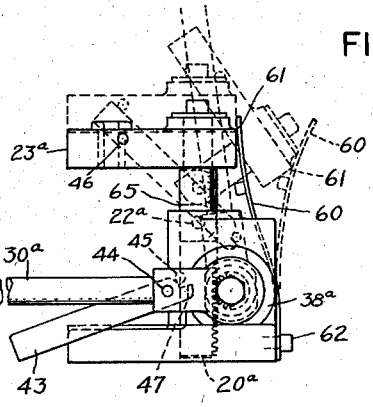

The swinging of the upper jaw and bushing plate 23 may be manually performed, or means may be provided such as illustrated in Figs. 3 and 4, for effecting the rocking of the jaw automatically as it approaches its upper limit of vertical movement. In the form illustrated in those figures, the rocking device comprises a finger 43 pivoted at 44 to the actuating lever 30$^a$. The finger 43 normally projects forwardly to a position whereat its upper edge engages an extension 46 on the movable jig plate 23. By such an arrangement the initial movement of the hand lever in an unclamping direction, elevates the jig-plate 23 until the finger 43 is about to engage the extension 46. Further movement of the lever 30, rocks the bushing plate 23 about its pivotal axis, and permits ready access to the workpiece.

Movement of the finger 43 in one direction relative to the lever 30 is limited by a pin 45 mounted in the lever 30 offset from the pivotal axis 44 of the finger 43. On an unclamping movement of the actuating lever, a stop element 47 projecting from the finger 43 engages the pin 45 and effectively holds the finger in position enabling it to engage and rock the upper jaw and bushing plate at the proper time.

Automatic return of the jaw member to normal operating position may be effected, if desired, by means of a suitable spring 60, that is mounted at 62 to the base 10. In this particular form, the free end of the spring is engaged by the rear corner of the upper jaw member as the jaw member approaches its uppermost position. Further turning of the hand lever, by reason of the finger 43 engaging the extension 46, rocks the vise jaw, about its pivots 21ª and 22ª, to a position out of the way. The rear edge 61 of the vise-jaw, in the Fig. 4 form, is engaged by the spring 60 and the spring pressure resulting holds the vise jaw in its open position. On reverse movement of the hand lever the pivots 21ª, 22ª travel downwardly and the spring pressure reacts to restore the vise jaw to its normal operating position.

In the forms of the invention illustrated in Figs. 3-8, the various elements of the jig-vises correspond essentially to the parts described in connection with Figs. 1 and 2, and have therefore been similarly numbered with exponents, and repetitious description thereof is believed unnecessary. In the vise shown by Figs. 3 and 4, the rack bars 19ª and 20ª are formed with one-way acting hinge joints 65 intermediate their ends, and the upper portions 24ª and 25ª of the rack bars are secured to the jaw member 23ª and function as piloting bars as well.

Figure 5:
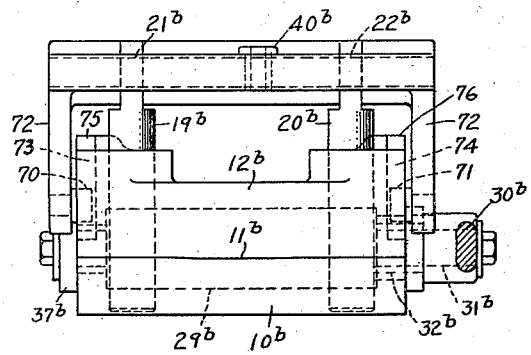
Figs. 5 and 6 are front and end views respectively of another form of jig-vise embodying this invention.
Figure 6:
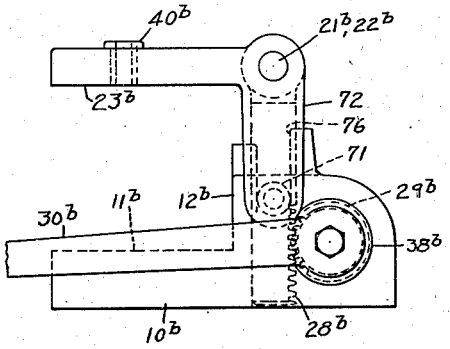

In the arrangement disclosed by Figs. 5 and 6, the piloting means is in the form of rollers 70 and 71 mounted at the free ends of levers 72 that are integral with the upper vise jaw 23ᵇ. The rollers 70, 71 operate in vertically arranged open-ended guide slots 73, 74 provided by the base member. In this form of the invention the length of the guide slots and lever arms of the rollers are also proportioned to afford long and accurate bearing means for the jaw 23ᵇ during normal clamping operations, but are open ended so that on an upward movement of the jaw member, the rollers 70, 71 leave their guides whereupon the jaw member is free to swing about its pivotal axis 21ᵇ and 22ᵇ, as above explained in connection with the device of Fig. 1. Preferably the rear walls of the slots 73, 74 are made to extend a short distance above the tops of the front walls, as indicated at 75 and 76, so that on a return rotation of the jaw and bushing plate, the rollers 70, 71 are quickly and automatically guided into their slots.

Figs. 7 and 8 illustrate the invention applied to a straddle type of jig in which the rack bars 19ᶜ and 20ᶜ are located at opposite ends and centrally of the base plate surface 11ᶜ. In this form, the rack bars are each in two parts 19ᶜ and 24ᶜ, and 20ᶜ and 25ᶜ, the members 24ᶜ and 25ᶜ being rigid with the upper jaw member 23ᶜ and normally piloting in the upper portions of the bores 16ᶜ and 17ᶜ that contain the rack bars. An operating connection between the upper and lower portions is established externally by means of U-shaped arms 80 and 81 that are suitably fastened to the upper jaw 23ᶜ and pivotally connected to cross pins 82 and 83 that extend transversely through each of the rack bars 19ᶜ and 20ᶜ. Supporting and guiding bearing members 84 and 85, each equipped with a bushing 86, 87 are suitably fastened in conventional manner to the base member and surround the rack bars and the piloting bars. The supporting members and bushings 84—87, are slotted at their sides, as at 88, to allow vertical movement of the rack bars and their cross pins 82, 83. In operating a jig-vise of this style, the upper jaw member 23ᶜ is elevated by the lever 30ᶜ until the piloting bars 20ᶜ, 25ᶜ, are withdrawn from their sockets. When that occurs, the upper jaw may be swung laterally to one side, about the pivotal axis 82, 83, and access to the workpiece is again made freely possible from above. This particular arrangement of piloting and pivot locations has the added advantage of providing a relatively long radius arm 80, 81 for the jaw member 23ᶜ. The pivotal axis 82, 83 being located relatively low on the rack bars, enables the user to swing the upper jaw through a large arc, and to clear the outer corners of large workpieces or fixture parts that may rest upon the base plate 11ᶜ.

It will be understood that the specific rack and pinion mechanisms, self-locking lever clamp, automatic jaw swinging and returning mechanisms above explained in connection with Figs. 1-4, or equivalent means, either in the identical form or with obvious adaptations are applicable to any of the specific jig-vises disclosed, and in the interest of clarity and brevity, a detailed description and illustration of such devices in connection with each form of vise disclosed is believed unnecessary.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. In a device of the character described, the combination of a base member adapted to support a workpiece, a combined work-clamping and bushing-plate member disposed in opposed relation to the base member and rectilinearly movable toward and away from the base member to effect simultaneous work-clamping and tool-locating means for guiding and for actuating said plate member to effect a work-clamping and tool-locating operation including a non-rotatable pull shaft element for movement of the plate member about an axis which extends transverse the direction of movement of said pull-shaft journaled in the base member for rectilinear movement, means pivotally connecting said plate member to said pull-shaft element and means constraining said plate member against angular movement relative to said pull shaft during movement of said clamping and bushing plate member to work-clamping position.

2. A jig-vise combining a lower jaw member and a rectilinearly movable and relatively rotatable upper jaw member, rectilinearly movable means journaled in the base to actuate said jaw members, guide means operative to maintain said jaws normally in parallel opposed relation during a rectilinear movement of the upper jaw from a work unclamped position to a work clamped position, and a pivotal connection between said upper jaw member and said rectilinearly movable jaw actuating means operative as a pivot about which the said upper jaw member may rotate relative to the said actuating means and relative to said lower jaw member when said upper jaw is in a work unclamped position.

3. The combination set forth in claim 2 in which the guide means are in the form of piloting bars on one member and coacting pilot bar receiving openings in the other of said members.

4. The combination set forth in claim 2 in which the guide means are separate from the jaw actuating means and comprise an antifriction roller carried by the upper jaw member and a cooperating roller receiving slot formed in the lower member.

5. A jig-vise combining a base member provided with a work supporting platform, a relatively movable and normally parallel bushing plate member cooperatively related to said work platform, means for actuating said bushing plate member in workpiece-clamping and workpiece-unclamping directions selectively, comprising a draw bolt element reciprocably journaled in said base member, means for actuating said draw bolt member, means pivotally mounting said bushing plate member to said draw bolt as to afford an axis about which said bushing plate may be moved out of parallelism with said platform, and means carried in part by said bushing plate and in part by said base member operative during a portion of the movement of said draw bolt in a work-clamping direction to align and thereafter maintain said bushing plate in parallelism with said work supporting platform.

6. In a device of the character described, the combination of a base member adapted to support a workpiece, a combined work-clamping and bushing-plate member mounted in opposed relation to the base member and rectilinearly movable into engagement with the workpiece to effect work-clamping and tool-locating simultaneously, means for actuating said plate member to a work-engaging and clamping position comprising a non-rotatable pull-shaft element journaled in said base member for rectilinear movement, and lever operated means also journaled in said base member and connected with said shaft to actuate same, means pivotally connecting said plate member to said pull-shaft element for movement of the plate member about an axis which extends transverse the direction of rectilinear movement of said shaft, and positive acting means constraining said bushing plate member against movement about its pivot during rectilinear movement of said pull-shaft and work-clamping and bushing-plate member to work-engaging and work-clamping position.

WILLIAM WOERNER.